United States Patent

[11] 3,628,381

[72] Inventors Martin L. Aronow
 Westbury;
 Denis Rehse, Long Island City, both of N.Y.
[21] Appl. No. 58,490
[22] Filed July 27, 1970
[45] Patented Dec. 21, 1971
[73] Assignee Bulova Watch Company, Inc.
 New York, N.Y.

[54] ELECTRICAL PRESSURE TRANSDUCER FOR HIGH-TEMPERATURE FLUID SYSTEMS
 8 Claims, 5 Drawing Figs.
[52] U.S. Cl. .................................................. 73/398 R, 73/406
[51] Int. Cl. .................................................. G01l 9/10
[50] Field of Search ........................................ 73/398 R, 398 AR, 406

[56] References Cited
 UNITED STATES PATENTS
 3,234,795 2/1966 Li .............................. 73/398 AR

*Primary Examiner*—Donald O. Woodiel
*Attorney*—Michael Ebert

ABSTRACT: An electrical pressure transducer for high-temperature fluid systems, the transducer including a sensor in the form of a hollow column, one end of which is provided with a headpiece, the other end being anchored. The column is inserted in a bore in the wall of a chamber or passage containing the fluid whose pressure is to be measured. The bore is hermetically sealed by a removable nipple having a diaphragm flush with the inner surface of the wall, the headpiece of the column abutting the diaphragm to transmit a compressive load to the column that reduces the longitudinal dimension thereof to an extent proportional to fluid pressure. Attached to the headpiece and disposed coaxially within the column is a rod which is axially displaced as a function of fluid pressure, the motion of the rod being converted into a corresponding electrical value.

ELECTRICAL PRESSURE TRANSDUCER FOR HIGH-TEMPERATURE FLUID SYSTEMS

BACKGROUND OF THE INVENTION

This invention relates generally to electrical pressure transducers, and more particularly to a transducer adapted to measure dynamic fluid pressure in a high-temperature system.

Although available in a large variety of types and constructions, the primary element or sensor of conventional electrical pressure transducers generally takes the form of a bourdon tube, a spiral spring, a diaphragm, a bellows or a modification of these forms. To convert the mechanical action of the sensor into a corresponding electrical value, use is made of a measuring element in the form of a strain gauge or a motion-responsive capacitive, piezoelectric or magnetic device.

When an electrical pressure transducer is to be used to measure dynamic fluid pressure in a high-temperature system, certain problems arise which are not encountered in other environments. Typical of such systems are aircraft gas turbines, high-temperature hydraulic devices and plastic injection- and blow-molding machines as well as plastic extruders and diecasting arrangements.

While the present invention will be described in the context of a plastic extruder for measuring the pressure of the melt, it is to be understood that this is by way of example only, and that a transducer in accordance with the invention is generally useful in connection with the measurement of fluid pressure in high-temperature environments.

Among the electrical pressure transducers presently employed in measuring high-temperature fluid is the bourdon tube type wherein the open end of the tube communicates with the fluid chamber, the other end of tip of the tube being linked to an electrical element such as a variable resistor. In dynamic measurements, the bourdon tube transducer has two distinct drawbacks. First, its response time is relatively slow, for it takes a significant period for internal pressure to cause the curved tube to straighten and to thereby produce a motion at the tip of the tube. Secondly, fluid trapped in the bourdon tube, in the case of an extrusion system, may result in carbonization or polymerization of the melt due to the temperatures involved and the absence of mixing or fluid agitation. The same problem is encountered in other high-temperature plastic systems, such as those used in synthetic fiber spinning. Moreover, fluid or plastic material introduced in a bourdon tube may solidify and altogether block the tube and prevent pressure measurement.

In order to isolate the electrical element from the sensor which is subject to the high-temperature fluid, it is also known to use an intermediate fluid such as mercury contained in a capillary column enclosed by diaphragms. But this arrangement has a poor dynamic response similar to that of the bourdon tube type transducer. Moreover, it is necessary that this device be relatively long to avoid exposing its electrical element, such as a strain gauge, to high temperatures.

Another approach makes use of a thick membrane or diaphragm capable of withstanding the high pressures encountered in the systems of interest. To afford sufficient deflection for a reasonably accurate measurement, it is essential that the thick diaphragm be of large diameter. This is a drawback in those situations calling for a small transducer to minimize interference with the system whose fluid pressure is being measured.

Another factor that comes into play in fluid pressure transducers is the destructive mechanical and chemical effect of the hot fluid on the sensor. The sensor, of necessity, must take the form of a pressure-responsive or deflectable element directly exposed to the fluid. This fluid, in the case of a plastic extruder, flows along the surface of the sensor to impose a shear force thereon as well as a bending force. Consequently, when the deflecting element is made relatively thin to improve its sensitivity, it has a relatively short life. Also the fluid may erode the sensor metal. Replacement of the diaphragm or membrane in existing transducers usually involves replacement of the entire sensor, thereby making replacement costs high.

SUMMARY OF THE INVENTION

In view of the foregoing, it is the main object of this invention to provide an improved electrical pressure transducer adapted to measure static and dynamic fluid pressures in a high-temperature system. A transducer in accordance with the invention is capable of providing accurate measurements in a range extending from moderate to high pressure levels.

More specifically, it is an object of the invention to provide an electrical pressure transducer which may be installed in a chamber or passage containing a high-temperature fluid whose pressure is to be measured without having the transducer introduce any obstacle or obstruction in the passage or vessel.

A significant advantage of the invention is that the transducer includes a replaceable nipple affording a flush mounting in the vessel or passage, thereby obviating interstitial spaces or cavities acting to entrap the fluid. Since movement of the fluid and the mixing action thereof within the passage or chamber is not impeded by the transducer, static fluid pockets resulting in carbonization or polymerization are avoided.

Also an object of the invention is to provide an electrical measuring element operating in conjunction with a pressure sensor in a high-temperature environment, which measuring element affords an electrical output that is compensated for variations in temperature, thereby obviating the need for a long stem to thermally isolate the sensor from the measuring element.

Still another object of the invention is to provide a transducer of the above type which is reliable in operation, as well as being rugged and easy to install.

Briefly stated, these objects are attained in an electrical pressure transducer including a sensor in the form of a hollow column, one end of which is enclosed by a headpiece, the other and open end being anchored. The column is inserted in a bore in the wall of a chamber or passage containing the fluid whose pressure is to be measured, the bore being sealed by a removable nipple having a thin diaphragm flush with the inner surface of the wall. The headpiece of the column abuts the diaphragm. Consequently, a compressive load from the fluid in the chamber is transmitted to the column which reduces its longitudinal dimension. Attached to the headpiece and disposed coaxially within the column is a rod which is axially displaced as a function of fluid pressure, the motion of the rod being converted into a corresponding electrical value.

OUTLINE OF THE DRAWING

For a better understanding of the invention, as well as other objects and further features thereof, reference is made to the following detailed description to be read in conjunction with the accompanying drawing, wherein:

FIG. 3 is a transverse section taken in the plane indicated by line 3 3 in FIG. 2;

FIG. 4 is a perspective view of the nipple of the transducer; and

FIG. 5 is a perspective view of the column and rod assembly.

Figure 1:
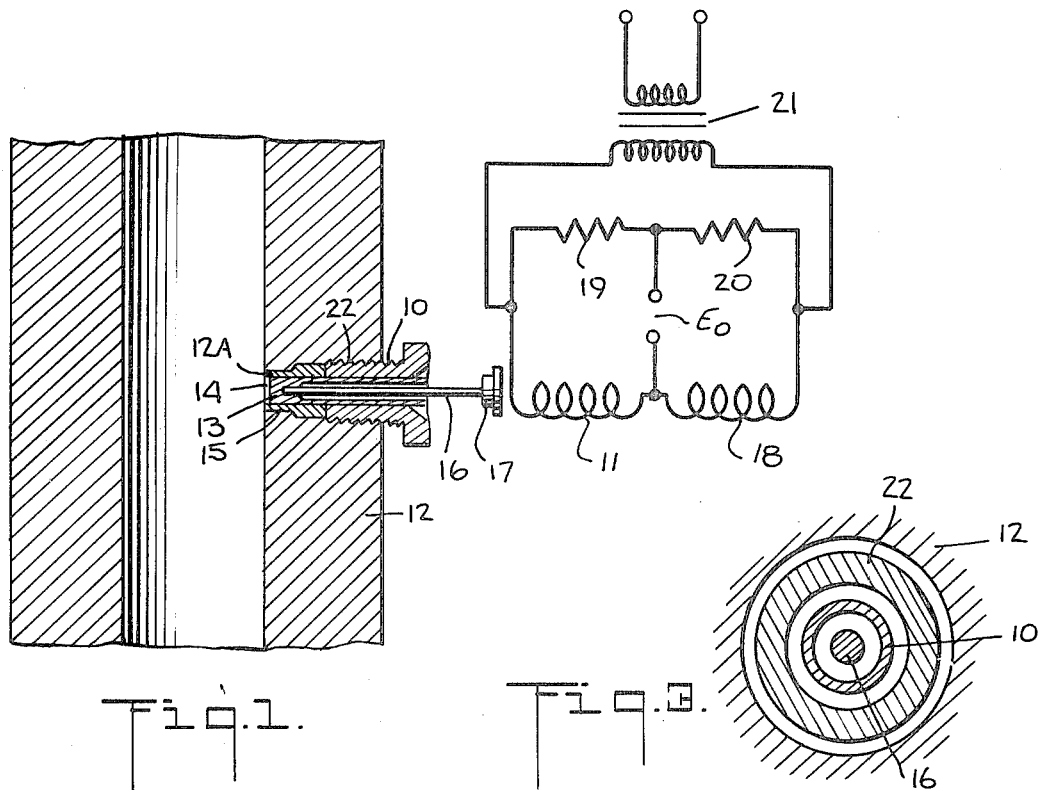
FIG. 1 is a schematic diagram of an electrical pressure transducer in accordance with the invention.
Figure 2:
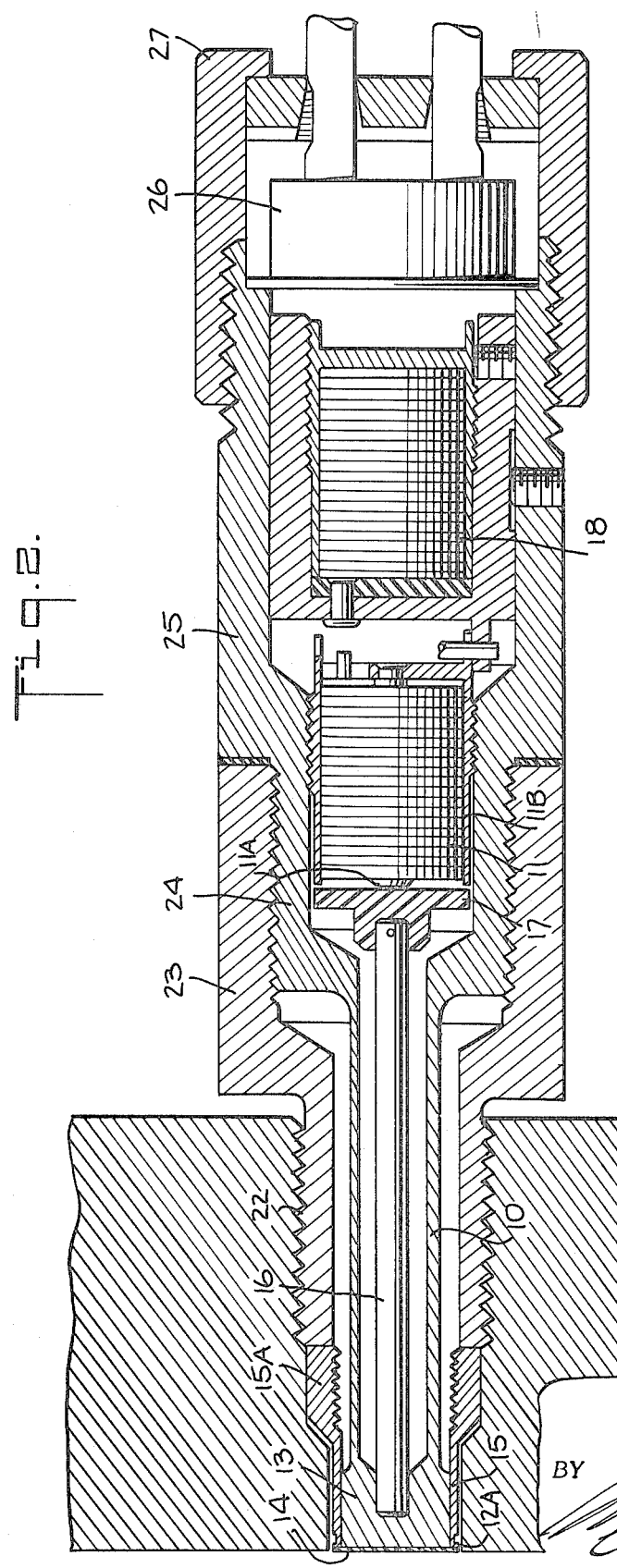
FIG. 2 is a longitudinal section taken through the transducer.

Referring now to the drawing, and more particularly to FIG. 1, the electrical pressure transducer in accordance with the invention is constituted by a primary element or sensor including a hollow column 10, and a measuring element including a coil 11. The transducer is installed in a plastic extruder operating at high temperature, the wall 12 of the extruder having a bore 12A therein.

Column 10 is inserted in bore 12A, the free end of the column being enclosed by a headpiece 13. Headpiece 13 abuts the compliant diaphragm 14 of a nipple 15 which hermetically seals the bore. Diaphragm 14 lies flush with the inner surface of wall 12 whereby fluid pressure causes the diaphragm to flex inwardly to impose pressure on headpiece 13. The other end of column 10 is anchored whereby fluid pressure imposes a compressive load on the column effecting a reduction in the longitudinal dimension thereof to an extent proportional to fluid pressure.

It is important to note that the exterior and interior of column 10 are under atmospheric pressure and that the fluid pressure is not applied to the column at any point other than the headpiece thereof. It has been found that when the fluid pressure is so applied, a linear relationship exists between the longitudinal dimension or length of the tube and fluid pressure, whereas if fluid pressure were also applied around the column, this relationship would become nonlinear.

Disposed coaxially within column 10 and attached at one end to headpiece 13 is a rod 16 which, as column 10 is shortened as a function of fluid pressure, is displaced axially, but since the rod is unstressed, the rod length remains unchanged. Secured to the other end of rod 16 is a disc-shaped armature 17 which is positioned in proximity to coil 11 of the measuring element, the armature and coil acting as a variable reluctance magnetic device whose output depends on the spacing between armature 17 and coil 11.

Coil 11 forms one arm of a wheatstone bridge circuit whose other arms are constituted by a second coil 18 whose inductance matches that of coil 11 in the static state of the transducer, and by resistors 19 and 20. Applied to the input terminals of the bridge is an alternating current derived from transformer 21, the arrangement being such that the bridge is balanced at zero pressure or at any other selected datum state of the transducer regardless of whether the applied pressure is static or dynamic. The transducer operates effectively under dynamic or static conditions. When, as a result of armature movement, the bridge is unbalanced, there is produced an output $E_o$ at the output terminals which reflects the degree of unbalance and hence the level of fluid pressure.

Since the inductance of coil 11 is affected by changes in temperature, this deviation is compensated for by matching coil 18 which is incorporated in the transducer structure and is subject to the same change in temperature. The bridge arrangement may be included in a closed process loop to automatically regulate the pressure of the fluid system.

Referring now to FIGS. 2 to 5, the structure of the transducer is shown in greater detail. It will be seen that nipple 15, which fits within bore 12A in the wall of the extruder, is removably attached to the end of a stem 22 within which column 10 is concentrically disposed. Stem 22 extends from and is integral with a front casing section 23. Telescoping within front casing section 23 is a cylindrical barrel 24 which extends from and is integral with a rear casing section 25. The open end of column 10 is anchored on the end of barrel 24, within which is nested coil 11. Coil 18 is accommodated within rear casing section 25. A terminal block 26 is mounted on the end of rear casing section 25 and is held thereto by a sleeve 27.

It is important to note that diaphragm 14 of nipple 15 is in intimate contact with headpiece 13 of the column; hence the elastic behavior of the diaphragm is not a factor in the measurement. Shear and bending forces acting on the nipple and diaphragm are decoupled from the column, thereby leaving only the compressive force. As will be seen in FIG. 2, the enlarged head portion 15A of nipple 15 is internally threaded. This threading facilitates extraction of the nipple from the entry port by means of a jack bolt or other tool threadably engaging the nipple.

In practice, column 10 and rod 16 are made of stainless steel having the same temperature coefficient of expansion, so that no disparity in response occurs as a result of changes in temperature. Armature 17 at the end of rod 16 is preferably of Kovar or other magnetic material having a high curie point. The magnetic circuit for coil 11, which includes the tubular casing 11B, is also of Kovar, whereas the outer casing section 25, within which the coil is supported, is of stainless steel. The parameters are such that as an increase in temperature tends to bring the armature 17 closer to coil 11 as a result of metal expansion, coil 11 is shifted away from the armature to an extent maintaining the initial distance therebetween in the absence of fluid pressure. Consequently even though the pressure transducer is subject to the temperature of the fluid being measured, it is substantially insensitive thereto and provide accurate pressure readings.

While there has been shown and described a preferred embodiment of the electrical pressure transducer of the invention, it will be understood that many changes and modifications may be made therein without, however, departing from the essential spirit of the invention.

We claim:

1. An electrical pressure transducer adapted to measure dynamic or static fluid pressure, the transducer being installable in the wall of a chamber or passage containing the fluid without introducing any obstacle therein, said transducer comprising:

A. a sensor constituted by a hollow column, one end of which is enclosed by a headpiece, the other end being anchored, the column being received within a bore in said wall, B. a removable nipple insertable in said bore and sealing same, said nipple having a diaphragm flush with the inner surface of said wall, the column headpiece abutting the diaphragm whereby a compressive load is transmitted to the column which reduces its longitudinal dimension as a function of fluid pressure, and C. means responsive to the changing dimension of said column to generate an electrical value proportional to fluid pressure.

2. A transducer as set forth in claim 1, wherein said column is coaxially disposed within a stem threadably received in said bore.

3. A transducer as set forth in claim 2, wherein said stem extends from and is integral with a casing section within which is disposed a cylindrical barrel onto which said column is anchored.

4. A transducer as set forth in claim 1, wherein said means is a strain gauge.

5. A transducer as set forth in claim 1, wherein said means is a variable-reluctance pickup.

6. A transducer as set forth in claim 5, wherein said variable-reluctance pickup is constituted by an armature and a coil, said armature being attached to one end of a rod which passes through said column and whose other end is secured to said headpiece, said coil being disposed within a casing, whereby the axial position of the armature relative to the coil shifts as a function of fluid pressure.

7. A transducer as set forth in claim 6, wherein said armature, said column, said rod and said casing are made of materials having temperature coefficients of expansion which are such as to maintain a predetermined separation between the armature and the coil.

8. A transducer as set forth in claim 6, further including a second coil mounted in said casing, said second coil having an inductive value which is equal to that of the pickup coil in the static state, the two coils being connected in a bridge circuit to produce an output signal which is independent of temperature variations.

* * * * *